UNITED STATES PATENT OFFICE.

ADOLF J. GRINBERG, OF NEW YORK, N. Y., AND BERNARD FELDMAN, OF PLYMOUTH, MASSACHUSETTS.

PROCESS OF PROPAGATING PLANTS.

1,172,021. Specification of Letters Patent. Patented Feb. 15, 1916.

No Drawing. Application filed March 6, 1915. Serial No. 12,500.

*To all whom it may concern:*

Be it known that we, ADOLF J. GRINBERG and BERNARD FELDMAN, both citizens of the United States, and residing, respectively, in the city, county, and State of New York, and in the city and county of Plymouth, State of Massachusetts, have invented a new and useful Process of Propagating Plants, to be used in the treatment of trees and vegetation in general, for the purpose of improving the physical condition thereof, increasing the productiveness thereof, and bringing about a generally more healthy condition.

It is a well known fact that the use of fertilizers and various other means used to stimulate the growth of vegetation, frequently fails to bring the desired result and falls short particularly in the matter of increasing the bearing qualities or functions of the said vegetation.

By the use of our process of propagating plants in the manner set forth herein, we have demonstrated that the desired results can be obtained.

Our process involves the use of a composition consisting of dextrogermoform, ammonia, cornstarch, water.

"Dextrogermoform" is the name we have given to the ingredient formed by the following articles in the proportions named: bran 6 ounces, sawdust 6 ounces, lime 1 ounce, soil 50 pounds.

This mixture together with scraps of iron, or iron nails is applied to the roots of the vegetation to be treated. The purpose of the iron is to generate heat in the mixture by oxidation. We also install between the said roots, a system of vertically disposed pipes with their upper ends open to the air, thereby admitting to the roots the different temperatures and bacteria of the atmosphere and permitting the egress of obnoxious gases. In addition about once a week the following mixture is applied to the roots through the said pipes: water 1 quart, cornstarch ½ ounce, ammonia liquid ½ ounce. As applied in this manner, the bran in the dextrogermoform develops diastase ferment which attacks the cornstarch and sets free the phosphates and nitrates in the bran. During the process, fermentation takes place which renders available the phosphorus and nitrogen content of the mixture.

We have found this composition a most satisfactory substitute for fertilizers of any kind and the use thereof greatly increases fertility and hastens the bearing time of the vegetation.

A second growth of foliage can also be procured by the use of our invention in cases where vegetation has been denuded of its foliage.

We claim—

1. The process of propagating plant life which consists in adding to the soil about the roots of the plant a mixture composed of bran, sawdust, lime, ammonia, cornstarch, water and small pieces of iron, permitting access of atmospheric air to the mixture and from time to time adding further amounts of water, corn-starch and ammonia.

2. The process of propagating plants which consists in adding to the soil about the roots of the plants a mixture containing about six ounces of bran, six ounces of sawdust, one ounce of lime, one half ounce of corn-starch, one half ounce of ammonia liquid, one quart of water, and sufficient iron scrap or pieces to heat the mixture by oxidation, to about fifty parts of the soil, establishing communication between the atmospheric air and the mixture at the roots of the plants and adding from time to time, as required, further amounts of water, cornstarch and ammonia.

ADOLF J. GRINBERG.
BERNARD FELDMAN.

Witnesses:
P. IRVING GRINBERG,
GEORGE C. PETERSON.